United States Patent [19]

Bhavsar

[11] Patent Number: 4,498,172

[45] Date of Patent: Feb. 5, 1985

[54] SYSTEM FOR POLYNOMIAL DIVISION SELF-TESTING OF DIGITAL NETWORKS

[75] Inventor: Dilip K. Bhavsar, Liverpool, N.Y.

[73] Assignee: General Electric Company, Syracuse, N.Y.

[21] Appl. No.: 402,161

[22] Filed: Jul. 26, 1982

[51] Int. Cl.³ ............................................ G01R 31/28
[52] U.S. Cl. ........................................ 371/25; 371/15
[58] Field of Search .................................. 371/25, 15

[56] References Cited

U.S. PATENT DOCUMENTS 3,739,160  6/1973  El-Hasan et al. ...................... 371/25
4,433,413  2/1984  Fasang ................................. 371/25

OTHER PUBLICATIONS

Benowitz, Norman, "Fault Detection/Isolation Results from AAFIS Hardware Built-In Test", *NAECON '76 Record*, pp. 215-222.
Frohwerk, Robert A., "Signature Analysis: A New Digital Field Service Method", *Hewlett-Packard Journal,* May 1977, pp. 2-8.
Konemann, Bernd, et al., "Built-In Logic Block Observation Techniques", *Proceedings 1979 IEEE Test Conference,* pp. 37-41.
Bhavsar, Dilip K., et al., "Self-Testing by Polynomial Division", *Digest of Papers* 1981 *International Test Conference,* IEEE, pp. 208-216.

*Primary Examiner*—Charles E. Atkinson
*Attorney, Agent, or Firm*—Richard V. Lang; Nathan D. Herkamp

[57] ABSTRACT

A built-in test system employs dual-mode feedback shift registers to supply test vectors and evaluate test responses of functional and interface networks of a logic system. Test responses are supplied to a quotient bit compressor which generates a system response signature for comparison with an expected fault-free signature to produce a system pass/fail status signal.

11 Claims, 4 Drawing Figures

SYSTEM FOR POLYNOMIAL DIVISION SELF-TESTING OF DIGITAL NETWORKS

BACKGROUND OF THE INVENTION

1. Field of the Invention

This invention relates to testing of digital networks, and, more particularly, to self-testing of digital networks by a system for supplying test vectors to subsystem modules of a system being tested and processing the output from all subsystem modules of the system to produce a signature which can be evaluated to determine the pass/fail status of the system.

2. Description of the Prior Art

In recent years self-testing techniques have been increasingly sought to meet the growing challenge of testing VLSI chips and systems. These techniques fall in two categories, namely, on-line and off-line self-testing. Off-line self-testing requires a source of test stimulii (test vectors), a means for evaluating test responses, and means to control the test procedure and test status reporting. One popular off-line self-testing technique employs feedback shift registers (henceforth abbreviated as FSRs) to generate test vectors and to evaluate test responses. This technique has been called POLYNOMIAL DIVISION self-testing as the FSRs, whether used for test vector generation or response evaluation, perform the process of division by their characteristic polynomial. As shown in FIG. 1, in this technique a functional network 10 to be tested is sandwiched between an FSR 12 on its inputs used as a test vector source, and a second FSR 14 on its outputs used as a response evaluator. Also connected to the output of the test vector generator 12 is a test-end detector 16 for indicating the conclusion of the testing of a particular functional network. A signature verifier 18 receives the output from the test response evaluator 14. A mode select and timing control unit 20 controls the test operation by providing appropriate mode select and timing signals to the FSRs and the signature verifier. During the mission operation (that is when not testing) the FSRs 12 and 14 either become transparent or form input/output registers for the functional network. Upon receiving the self-test command SLFTST 24 from an outside source (not shown), the mode select and timing control unit 20 issues signals to FSRs 12 and 14 over the signal lines 26 and 28 and inserts the FSRs at the functional network's inputs and outputs. The FSR 12 on inputs is configured to generate test vectors and supply them to the functional network over lines 32. Starting from the initial value, called seed, as the dividend, the FSR 12 performs one step of division by its characteristic polynomial in each clock interval. The remainder obtained in each division step is supplied as a test vector to the function under test 10. The sequence of remainders obtained in this way constitutes a pseudo-random binary seqeunce whose period P depends on the number of stages in the FSR, and the characteristic polynomial. The test vector set necessary for testing the functional network usually has length (number of vectors) L equal to or less than P. Thus, the test-end is marked by the occurrence of the test-end pattern in the pseudo-random binary sequence. The test-end detector 16 detects appearance of the test-end pattern over lines 32 and outputs test-end signal 34 to the control unit 20. At this time the control unit 20 outputs a signal 36 to the signature verifier 18.

While the input FSR 12 to configured to generate test vectors, the output FSR 14 is configured to provide a signature needed for evaluation. For response evaluation FSR 14 employs the division of the output from function under test 10 by characteristic polynomial of the FSR to recursively compress the test response data. At the end of test indicated by test-end detector, the output FSR contains that will be called the response signature of the functional network 10 under test. This signature is provided to the signature verifier 18 where it is compared with the expected fault-free signature stored in the signature verifier. If the response signature agrees with the expected signature, the functional network 10 passes the test; otherwise, it fails. The output 42 from the verifier 18 indicates the pass or fail status of the functional network 10. The probability of error escape, that is, a faulty network producing on erroneous response sequence with the same response signature as the fault-free-expected signature, is governed by the number of stages in the output FSR for each function under test in the prior art system described above.

SUMMARY OF THE INVENTION

An object of the present invention is to provide a means for self-testing a system by employing a POLYDIV self-testing technique on individual functional networks within a system and employing a central signature processor to process the outputs from the functional networks being tested.

A particular object of the present invention is to provide a POLYDIV self-testing system which collects quotients of the polynomial division process from individual functional networks, compresses the quotients in a central signature processor to produce an overall-response signature and then compares the overall-response signature with an expected fault-free signature to determine the pass/fail status of the system.

Accordingly, the present invention includes a test vector generator for each functional network of a system to be tested, a test response evaluator for each functional network, and a central signature processor for receiving the quotient outputs from all the test response evaluators. The central signature processor includes a quotient bit compressor and a signature verifier to compare the response signature of the system with its expected fault-free signature. A control unit is connected to the vector generators, the response evaluators and the signature processor for controlling the test procedure. In a preferred embodiment of the present invention, each FSR operates in dual modes; in one mode as a test vector generator for its downstream network, and in a second mode as a test response evaluator for its upstream network. Within the central signature processor a multiplexer may be used to select the quotients from FSRs operating as response evaluators and feed them to the quotient bit compressor.

BRIEF DESCRIPTION OF THE DRAWINGS

The features of the invention believed to be novel and unobvious over the prior art are set forth with particularity in the appended claims. The invention itself, however, as to organization, method of operation and best mode contemplated by the inventor, will best be understood by reference to the following description taken in conjunction with the accompanying drawings, in which like reference characters refer to like elements throughout, and in which:

DESCRIPTION OF THE PREFERRED EMBODIMENTS

Figure 1:
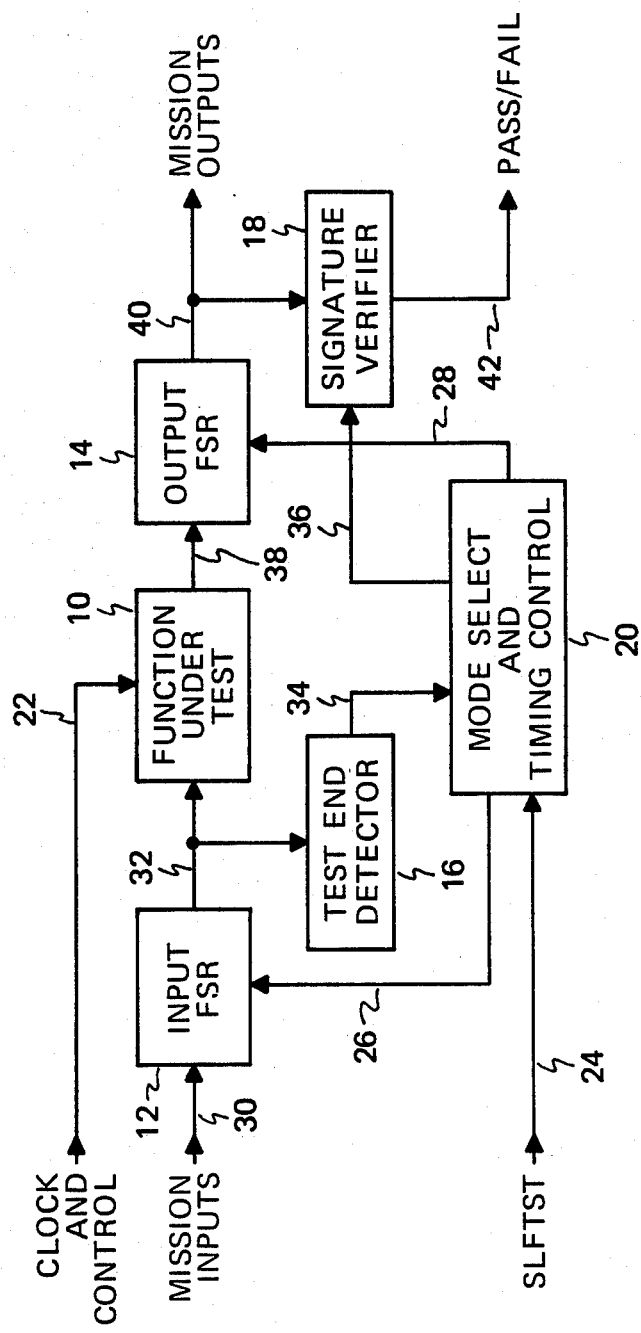
FIG. 1 is a schematic block diagram illustrating a prior art polynomial division self-testing technique.
Figure 2:
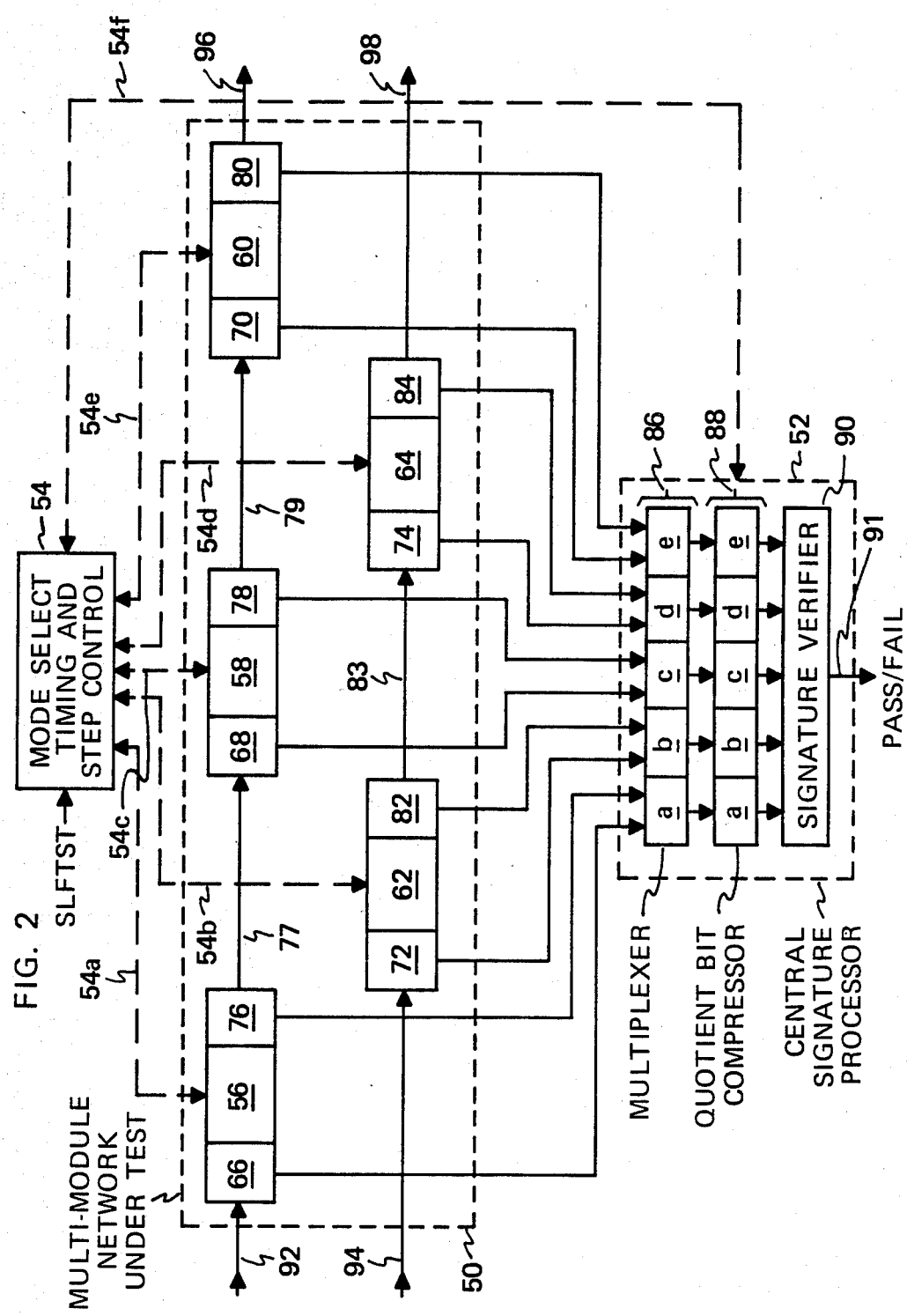
FIG. 2 is a schematic block diagram illustrating the polynomial division self-testing technique of the present invention.

FIG. 2 illustrates the implementation of the present invention for a self-testing system consisting of a multi-network system 50 under test and a central signature processor (CSP) 52 both receiving control signals from the mode select, timing and step control 54. The system 50 comprises functional networks 56, 58, 60, 62, 64, each having an input FSR 66, 68, 70, 72, 74, respectively, and an output FSR 76, 78, 80, 82, 84 respectively. The central signature processor 52 includes a multiplexer 86, a quotient bit compressor (QBC) 88 and a signature verifier 90.

The system operates as follows:

Upon receiving the self-test command from an outside source (not shown) the control unit 54 issues mode select, timing and step control signals over connections shown schematically as the dashed lines 54a–54f to the networks being tested and the CSP 52. During a first testing step the FSRs 66, 68, 70, 72, 74 are put in the vector generate mode and generate a pseudo-random binary sequence as test vectors for their respective networks, and FSRs 76, 78, 80, 82 and 84 are put in the response evaluator mode to compress the outputs from their respective upstream networks 56, 58, 60, 62 and 64 by the process of polynomial division (POLYDIV). The generator and the response evaluator FSR in each functional network produce their quotient bit outputs. The quotient bit outputs are fed pairwise to the multiplexer stages 86, 86b, 86c, 86d and 86e of the multiplexer 86. During step one, under control from control unit 54, the multiplexer 86 selects quotient outputs from the compressing FSRs, that is, FSRs 76, 78, 80, 82 and 84, and feeds them to QBC 88. QBC 88 comprises a feedback shift register which recompresses the quotient data bits from all the compressing FSRs in step one simultaneously to produce a step one signature of the system 50. Each functional network has its own test-end detector (not shown) which signals the completion of the network test. When all the network tests are completed, the step one testing ends, and the control unit 54 switches the system to step two testing. During step two the FSRs 76, 78, 80, 82 and 84 operate as test vector generators for their respective downstream interfaces/interconnections, and FSRs 66, 68, 70, 72 and 74 operate as response evaluators for their respective upstream interfaces/interconnections. Under control from the control unit 54 multiplexer 86 selects the quotient outputs from the compressing FSRs 66, 68, 70, 72 and 74 and feeds them to QBC 88. QBC 88 receives the quotient outputs from the multiplexer bit-by-bit, combines the step two outputs with the data in the QBC, and recompresses the quotient bit data by polynomial division to produce the response signature for the system 50. QBC 88 feeds the response signature to the signature verifier 90, which compares the response signature with the expected fault-free signature hardwired or programmed into the signature verifier 90, and produces a pass/fail signal 91 indicative of system status. By the above-described technique a direct pass/fail status for the entire system is obtained from a single signature verification, eliminating the need to examine each functional network in sequence before obtaining a system status.

The prior art POLYDIV techniques generally employ the remainder as the response signature, as it is usually impractical to compare long quotient bit streams, due to the fact that to do so would require a signature verifier for each functional network each of adequate size to receive the long quotient bit data stream and retain a corresponding fault-free expected quotient. The error escape probability may be calculated for a network under test, which produces L-many test reponses of m-many bits each. An r-stage response evaluator (FSR) compresses these responses by the process of polynomial division and produces an r-bit remainder and an L-bit quotient. When the r-bit remainder is used as the response signature and compared against an r-bit fault-free remainder, the error escape probability is $$\frac{2^{mL-r} - 1}{2^{mL} - 1}$$

which is approximately equal to $$1/2^r \text{ when } mL >> r$$

That is, the error escape probability primarily depends on the number of FSR stages. (More FSR stages, lower the error escape probability.)

On the other hand, when the L-bit quotient is used as the response signature and compared with an L-bit expected fault-free quotient, then the error escape probability is $$\frac{2^{mL-L} - 1}{2^{mL} - 1}$$

which is approximately equal to $1/2^L$. Since usually the test length L is significantly greater than the number of stages r in each response evaluator FSR, the error escape probability with quotient checking is orders of magnitude smaller than that with remainder checking. The above analysis assumes that all errors are equally likely.

The present invention exploits the benefits of checking the quotient bit stream in the following way. By employing the quotient bit fed without compression to the CSP as the response signature for the individual network/interface, the error escape probability of the response evaluators is made independent of the number of stages they have. Further, instead of comparing a long quotient bit stream from each network, with a respective fault-free quotient, the quotient bit streams from all the network response evaluators are simultaneously recompressed by the QBC by the process of polynomial division, and the remainder produced by the QBC is used as the response signature for the whole system. Since the error escape probability of the respective network response evaluators with quotient checking is practically zero, the overall error escape probability of the system of the present invention is governed by the error escape probability of the QBC. This in turn depends on the number of stages in the QBC. Since providing a large number of stages for a single FSR used as the QBC of the present invention is less expensive in terms of hardware used for system error checking than is expanding the number of stages of an FSR for each functional network, the present invention reduces the cost of error checking at the same time that it improves probability of error detection.

Figure 3:
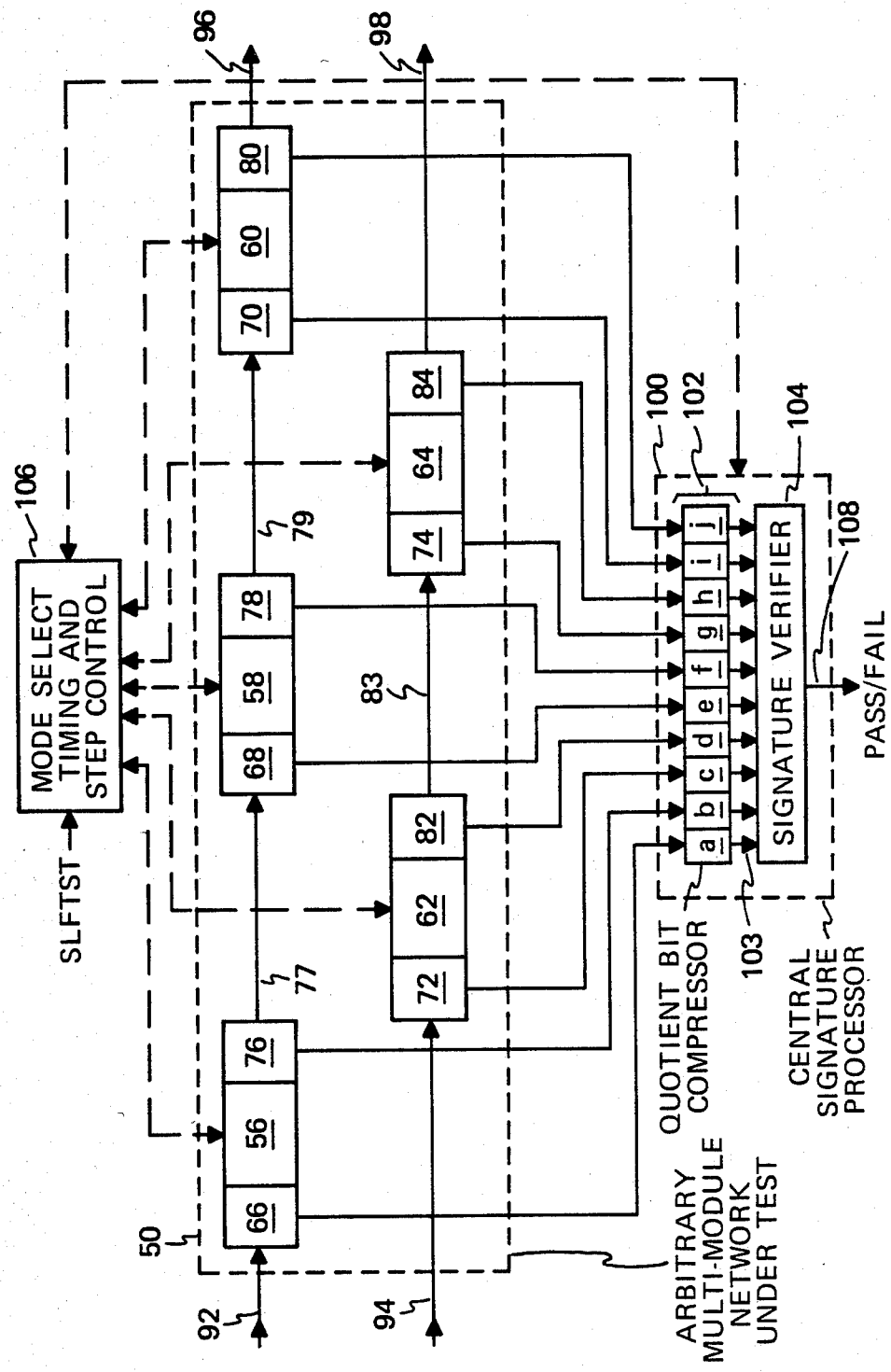
FIG. 3 is a schematic block diagram illustrating an alternative embodiment of the present invention.

An alternative construction of the present invention is illustrated in FIG. 3, in which a central signature processor 100 includes a QBC 102 and a signature verifier 104. During testing the mode select and timing control 106 initiates a two step test procedure similar to that described above relative to FIG. 2. In the first step FSRs 66, 68, 70, 72 and 74 operate in the vector generation mode to supply test vectors to functional networks 56, 58, 60, 62 and 64, respectively, and FSRs 76, 78, 80, 82 and 84 operate as output data compressors. All FSRs supply quotient bit data bit-by-bit directly to stages a through j, respectively, of QBC 102. After the first step is completed a second step is initiated by control unit 106 in which FSRs 76, 78, 80, 82 and 84 operate in the test vector generating mode and FSRs 66, 68, 70, 72 and 74 operate in the data compression mode. Again, all FSRs supply quotient bit data, bit-by-bit to stages a through j, respectively, of QBC 102. The FSRs on the boundary, namely, 66, 72, 80 and 84, also test the interface networks 92, 94, 96 and 98 which connect system 50 to other systems with the needed test signals supplied by equipments outside system 50. The quotient bit data received by the stages of the QBC 102 are compressed by QBC 102 into a response signature which is fed as output 103 to signature verifier 104, where it is compared with the built-in fault-free signature for the system to produce the pass/fail status signal 108 of the system 50. The CSP 100 requires no multiplexer, but requires QBC 102 to have a number of stages at least equal to the number of FSRs attached to the CSP, since CSP 100 must receive inputs directly from all FSRs whether in vector generate or the test evaluator mode. It will be noted that this is twice the number of stages of QBC 88, which receives quotient bit inputs from response evaluating FSRs only via the multiplexer 86. The designer may choose a CSP implementation which is most compatible with the system to be provided with self-testing capability.

Figure 4:
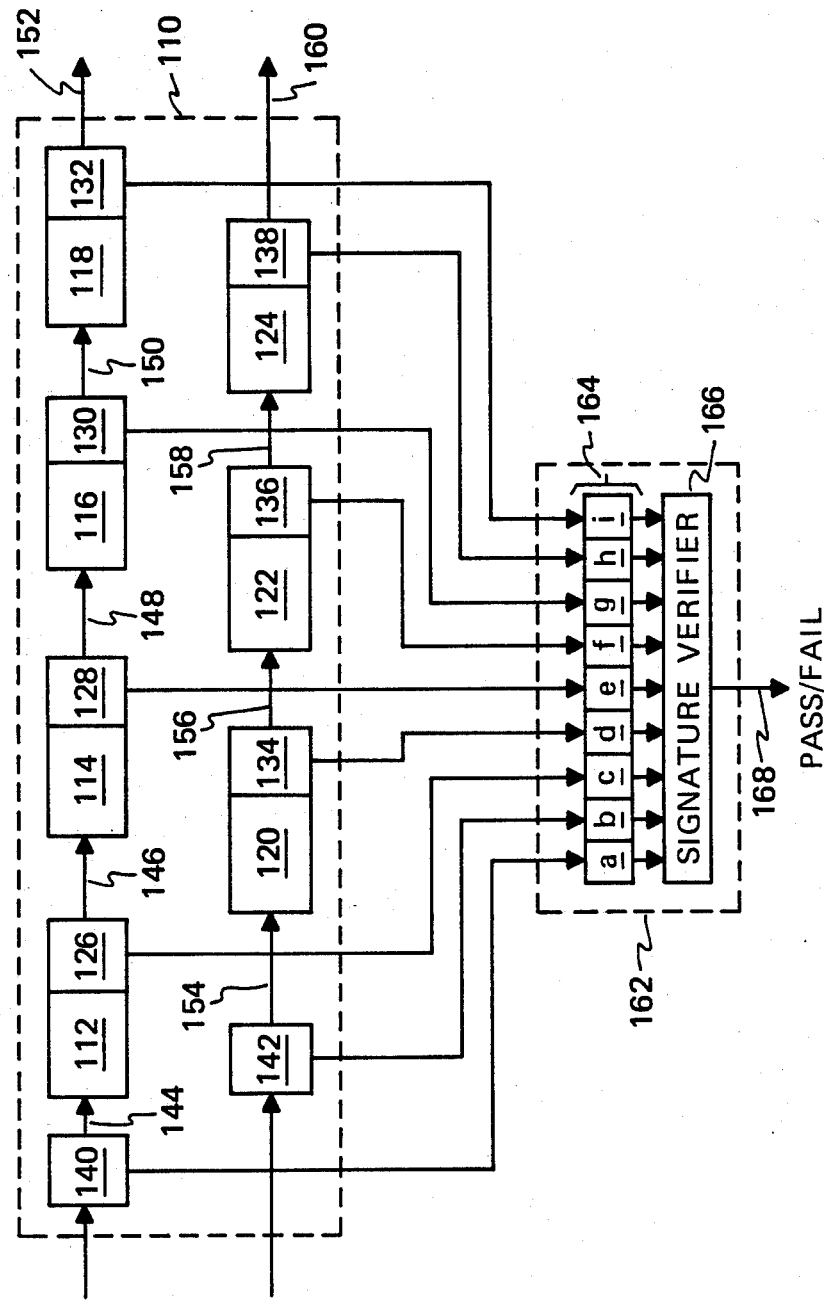
FIG. 4 is a schematic block diagram illustrating another alternative embodiment of the present invention.

FIG. 4 illustrates the POLYDIV arrangement called simplex, which may also be used with the present invention. In contrast to the systems decribed hereinabove employing duplex POLYDIV techniques, the simplex POLYDIV technique employs only one dual mode FSR for each functional network under test. The system 110 includes a plurality of functional networks 112, 114, 116, 118, 120, 122, 124 each having a FSR 126, 128, 130, 132, 134, 136, 138, respectively, connected thereto. Additional FSRs 140, 142 are provided to generate test vectors for the networks 112, 120, respectively, so that a FSR is connected to the input and output of each network of system 110. A mode select, timing and step control (not shown) is used to control the test operation of the simplex system. In a first self-testing step FSRs 140, 128, 142 and 136 operate as test vectors generators supplying test vectors to a functional network, interface network combination (e.g., FSR 128 supplies vectors to both interface network 148 and functional network 116), and FSRs 126, 130, 134 and 138 operate as data compression FSRs. At the completion of the first step functional networks 112, 116, 120, 124 and interface networks 144, 148, 154 and 158 have been tested. During a second step FSRs 126, 130 and 134 operate as test vector generator for a second self-testing step, and FSRs 128, 132 and 136 operate as data compression FSRs to test functional networks 114, 118 and 122 along with interface networks 146, 150 and 156. After both steps are completed, QBC 164 contains the system response signature which is supplied to signature verifier 166 for comparison with a fault-free signature stored in the signature verifier 166. If desired, the simplex arrangement could also be employed with a central signature processor including a multiplexer to control input to the QBC.

In either simplex or duplex POLYDIV self-testing as described herein, the number of stages of the QBC can be increased to any required number to reduce error escape probability to a desired level as described above. For simplex POLYDIV the number of stages must be at least equal to the number of FSRs, and in duplex POLYDIV the number of stages must be at least equal to the number of FSR pairs to receive inputs from all functional modules or interfaces under test. In either simplex or duplex POLYDIV self-testing according to the present invention, comparison of a single signature detects faults in the entire system.

Among the advantages provided by the present invention are the following:

1. Since test length and hence the quotient length (L) is usually larger than the number of stages (r) in the FSRs, the error escape probability of individual functional modules by quotient checking is orders of magnitude lower than that in remainder checking and is independent of the number of stages in the FSRs. The overall error escape probability is, therefore, dependent only on the number of stages in the QBC, which can be easily adjusted to obtain desired error escape level.

2. Detection of a fault in a network requires only one signature to be compared. This allows quick detection of faults in a system and reduces the hardware required for signature verification within the system.

3. Both functional networks and their interface networks within the system are tested by a single testing system.

4. The present invention also supports fault isolation by test maintenance depots. A system found in a field test to include a fault, may be tested again at a maintenance depot by checking the final contents of response evaluators for each functional network and interface network and comparing them with their respective fault-free signatures. The faulty functional module or the network thus isolated may be repaired or replaced.

What is claimed is:

1. Apparatus for self-testing a system which includes a plurality of functional network interconnected by interface networks comprising:

a first plurality of dual mode feedback shift registers, each connected to the input of respective ones of said plurality of functional networks, each of said feedback shift registers having a first mode of operation for generating a pseudo-random binary test sequence and a second mode of operation for evaluating responses by polynomial division to produce a succession of quotient bits;

a second plurality of dual mode feedback shift registers, each connected to the output of respective ones of said plurality of functional networks and to the input of a respective one of a plurality of interface networks, each of said feedback shift registers having a first mode of operation for evaluating responses by polynomial division to produce a succession of quotient bits and a second mode of operation for generating a pseudo-random binary test sequence; and a central signature processor comprising:
  compressor means for receiving quotient bit data output from each of said feedback shift registers when evaluating responses and generating a system-response signature by recursively compressing said quotient bit data from all of said plurality of feedback shift registers by polynomial division; and
  signature-verifying means for comparing said system-response signature with an expected fault-free signature and providing an output signal indicative of system status; and
control means for controlling the mode of operation of each of said feedback shift registers.

2. The invention of claim 1 wherein said quotient bit compressr means comprises;
means for combining said quotient bits from said first and second plurality of feedback shift registers and compressing said quotient bits into a systme signature.

3. The invention of claim 1 wherein said central signature processor further comprises:
a multiplexer means for receiving and selecting said successions of quotient bits from respective ones of said feedback shift registers when evaluating responses and transmitting said selected successions of quotient bits to said respective stages of said quotient bit compressor;
said multistage quotient bit compressor means comprises means for receiving said successions of quotient bits transmitted by said multiplexer means and compressing by polynomial division the quotient bits from said first or second pluralities of feedback shift registers to produce a system response signature; and
said signature verifying means comprises means for storing an expected fault-free signature, means for receiving said system response signature from said quotient bit compressor means and means for comparing said system signature and said expected fault-free signature.

4. The invention of claim 3 further comprising:
a control means for selecting the mode of operation of each feedback shift register of said first and second pluralities of feedback shift registers; and for controlling the multiplexer means to select and transmit quotient bit data from said feedback shift registers when evaluating responses to said respective stages of said quotient bit compressor.

5. The invention of claim 4 wherein:
said multiplexer means comprises a number of multiplexer stages equal to the total number of feedback shift register pairs in said first and second pluralities of feedback shift registers; and
said quotient bit compressor means comprises a number of feedback shift register stages at least equal to the number of stages of said multiplexer means.

6. Apparatus for self-testing a system which includes a plurality of interconnected functional networks comprising:
a plurality of dual mode feedback shift registers; each of said feedback shift registers being disposed between and conneted directly to a respective one of said plurality of functional networks and a respective one of a plurality of interface networks interconnecting said plurality of functional networks; each of said feedback registers having a first mode of operation for generating a pseudo-random binary sequence and a second mode of operation for evaluating responses by polynomial division;

a central signature processor comprising:
  quotient bit compressor means for receiving quotient bit data output from each of said feedback shift registers when operating in said second mode and generating a system response signature by compressing said quotient bit data from all of said plurality of feedback shift registers by recursive polynomial division; and
  signature verifying means for comparing said system response signature with an expected fault-free signature and providing an output signal indicative of system status; and
control means for controlling the mode of operation of each of said feedback shift registers.

7. The invention of claim 6 wherein said central signature processor further comprises:
a multiplexer means for receiving outputs from each of said feedback shift registers and selecting and transmitting simultaneously to said quotient bit compressor the output quotient bit data from said feedback shift registers operating in said second mode; and
said control means further comprises means for controlling said multiplexer means to select said outputs from said feedback shift registers operating in said second mode.

8. The invention of claim 7 wherein:
said multiplexer means comprises a number of multiplexer stages equal to the number of feedback shift register pairs in said plurality of dual mode feedback shift registers; and
said quotient bit compressor means comprises a feedback shift register having a number of stages at least equal to the number of stages of said multiplexer means.

9. A method of self-testing a system which includes a plurality of functional networks comprising the steps of:
(a) generating a plurality of pseudo-random test vectors for testing each respective functional network;
(b) inputting a respective plurality of said test vectors sequentially to said each respective functional network to produce a response output from said each respective functional network;
(c) dividing each of said respective outputs by a characteristic polynomial of a respective one of a plurality of receiving feedback shift registers to provide a respective first series of quotient bit data as an output signal;
(d) inputting simultaneously each said respective series of quotient bit data to a quotient bit compressor;
(e) compressing said quotient bit data by dividing said quotient bit data by a characteristic polynomial of said quotient bit compressor;
(f) generating a plurality of pseudo-random test vectors for testing respective interface networks interconnecting respective pairs of said functional networks;
(g) inputting a respective plurality of said test vectors sequentially to respective ones of said interface networks to produce a response output from each of said respective interface networks;

(h) dividing each of said respective outputs by a characteristic polynomial of a respective one of a plurality of respective receiving feedback shift registers to provide a respective second series of quotient bit data as an output signal;

(i) inputting simultaneously said respective second series of quotient bit data to said quotient bit compressor;

(j) dividing said quotient bit data of said first and second series of quotient bit data by said characteristic polynomial of said quotient bit compressor to produce a system response signature;

(k) comparing said system response signature with a predetermined fault-free signature; and (l) outputting a pass/fail signal indicating system status.

10. The method of claim 9 wherein each of said step (a) and (f) comprises:

(a) supplying an initial input to a respective feedback shift register and dividing said input recursively by a characteristic polynomial of said feedback shift register to provide a pseudo-random binary sequence from said respective feedback shift register as said respective plurality of test vectors.

11. The method of claim 10 wherein the step of inputting said quotient bit data to a quotient bit compressor comprises:

(a) supplying each of said first series of quotient bit data to respective stages of a multiplexer;

(b) supplying each of said second series of quotient bit data to respective stages of said multiplexer;

(c) outputting all of said first series of quotient bit data simultaneously from said multiplexer to said quotient bit compressor in a first multiplexer output step; and (d) after completion of said first multiplexer output step, outputting all of said second series of quotient bit data simultaneously from said multiplexer to said quotient bit compressor in a second multiplexer output step.

* * * * *